US009057354B1

(12) United States Patent
Walsh

(10) Patent No.: US 9,057,354 B1
(45) Date of Patent: Jun. 16, 2015

(54) HYDRO ENERGY-OFFSET TURBINE INSERT GENERATOR

(71) Applicant: UGREEN POWER, LLC, Birmingham, AL (US)

(72) Inventor: Patrick Michael Walsh, Grandville, MI (US)

(73) Assignee: UGreen Power, LLC, Birmingham, AL (US)

( * ) Notice: Subject to any disclaimer, the term of this patent is extended or adjusted under 35 U.S.C. 154(b) by 170 days.

(21) Appl. No.: 13/861,978

(22) Filed: Apr. 12, 2013

Related U.S. Application Data

(60) Provisional application No. 61/623,953, filed on Apr. 13, 2012.

(51) Int. Cl.
*F03B 13/00* (2006.01)
*F03B 13/10* (2006.01)
*H02P 9/04* (2006.01)

(52) U.S. Cl.
CPC .................................... *F03B 13/10* (2013.01)

(58) Field of Classification Search
CPC ...................................................... F03B 13/10
USPC ......................................... 290/43, 42, 53, 54
See application file for complete search history.

(56) References Cited

U.S. PATENT DOCUMENTS 6,313,545 B1 * 11/2001 Finley et al. .................... 290/54
8,072,089 B2 * 12/2011 Krouse et al. .................. 290/54

* cited by examiner

*Primary Examiner* — Javaid Nasri
(74) *Attorney, Agent, or Firm* — Sutherland Asbill & Brennan LLP

(57) ABSTRACT

The present disclosure describes a hydro energy-offset turbine insert generator to generate energy within a piping system. The system can include a fluid conduit that includes an inner wall structure and a pipe sleeve disposed along the inner wall structure to reduce the cross-sectional area of the interior of the conduit. The system can also include a turbine positioned within the fluid conduit adjacent the pipe sleeve and a flow diverter upstream of the turbine. A drive shaft is coupled to the turbine and extends to an area outside of the fluid conduit. The drive shaft can be directly or indirectly coupled to a generator or multiple generators positioned in the area outside of the fluid conduit. Fluid passing through the conduct can cause a rotational action in the turbine that causes a corresponding rotation in the drive shaft and generator to generate electricity.

20 Claims, 7 Drawing Sheets

HYDRO ENERGY-OFFSET TURBINE INSERT GENERATOR

RELATED APPLICATION

This application claims priority under 35 U.S.C. §119(e) to U.S. Provisional Patent Application No. 61/623,953, titled Hydro Energy-Offset Turbine Insert Generator, filed on Apr. 13, 2012, the entire contents of which are hereby incorporated herein by reference.

TECHNICAL FIELD

Aspects of the disclosure relate generally to fluid power generation, and more particularly, to systems and methods for fluid power generation with an energy-offset turbine insert generator in a fluid conduit.

BACKGROUND

Presently, regional energy grids are aging and are challenged to keep up with peak energy demands. Additionally, electrical utility rates have been known to substantially rise during peak usage hours resulting in increased expense and operating costs.

Some efforts have been undertaken to supplement or reduce reliance on the energy grid by harnessing "green" power. These efforts include employing arrays of solar power cells and wind farms. However, such efforts require additional real estate and space that may not be available. These space restrictions are an even greater issue in large metropolitan areas, where such space is at a premium. Additionally, these efforts do not take advantage of untapped sources of energy generation that may be implemented within the framework of existing infrastructure.

SUMMARY

Example embodiments of the present disclosure provide systems of a hydro energy-offset turbine generator. Briefly described, in architecture, one example embodiment of the system, among others, can include a turbine disposed in a fluid carrying conduit. The system can also include a drive shaft having a first end and a distal second end. The drive shaft can be coupled to the turbine between the first end and the second end and can be configured to rotationally drive the drive shaft. The second end of the drive shaft can extend to an area outside the conduit. A generator can be positioned outside the conduit and coupled to the drive shaft at or near the second end. The generator can generate electrical power in response to the rotational drive of the drive shaft by the turbine.

In accordance with another example embodiment of the present disclosure, a hydro energy system is provided that can include a turbine configured to be disposed in a fluid carrying conduit. The fluid carrying conduct can include a pipe elbow. A flow diverter can be positioned in the conduit upstream of the turbine. A drive shaft can be coupled to and rotationally driven by the turbine. The drive shaft can include a first portion coupled to the turbine and a distal second portion extending outside of the conduit. A generator can be positioned outside of the conduit and operatively coupled to the drive shaft. The generator can generate electrical power in response to the rotational drive of the drive shaft by the turbine.

In accordance with yet another example embodiment of the present disclosure, a hydro energy system is provided that can include a fluid carrying conduit. The conduit can have an inner wall defining a fluid passageway through the conduct that has a cross-sectional area. The system can also include a turbine disposed in the fluid carrying conduit and a reducing sleeve coupled to the fluid carrying conduit and disposed along an inner wall of the fluid carrying conduit proximate the turbine. The reducing sleeve can reduce the cross-sectional area of the fluid passageway. The system can also include a drive shaft having a first portion and a distal second portion. The first portion of the drive shaft can be coupled to and rotationally driven by the turbine. The second portion of the drive shaft can extend from the first portion to an area outside the conduit. The system can also include a generator positioned outside the conduit and operatively connected to the drive shaft. The generator can generate electrical power in response to the rotational drive of the drive shaft by the turbine.

There has thus been outlined, rather broadly, certain embodiments of the disclosure in order that the detailed description thereof herein may be better understood, and in order that the present contribution to the art may be better appreciated. There are, of course, additional embodiments that will be described below and which will form the subject matter of the claims appended hereto.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION OF THE EXAMPLE EMBODIMENTS

Figure 1A:
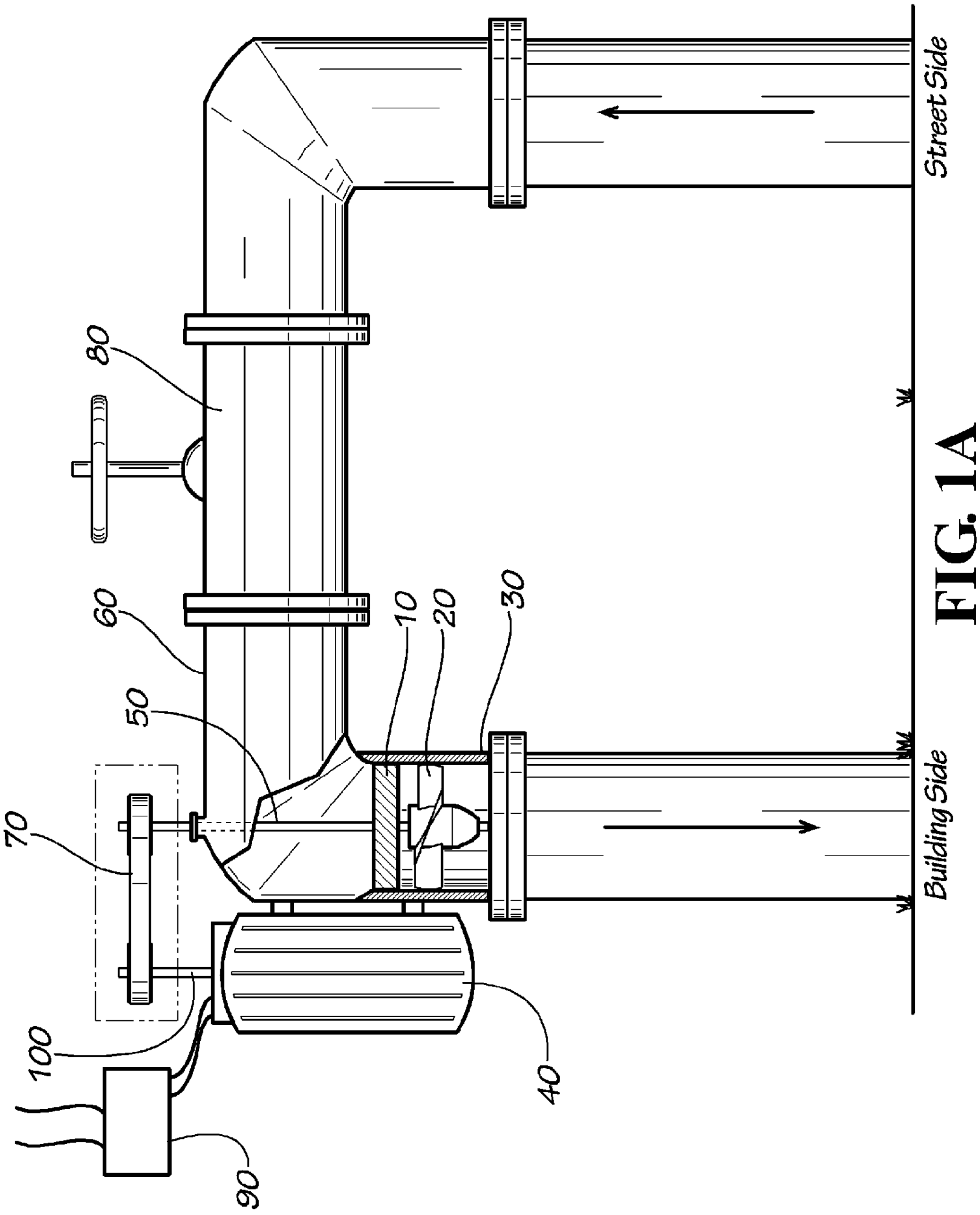
FIG. 1A illustrates a side elevation view, partially in cross-section, of a hydro energy apparatus illustrated with a belt drive transmission generator configuration in accordance with one example embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

In the following description, numerous details are set forth to provide an understanding of the present disclosure. However, it will be understood by those of ordinary skill in the art that the present disclosure may be practiced without these details and that numerous variations or modifications from the described embodiments may be possible. The disclosure will now be described with reference to the figures, in which like reference numerals refer to like, but not necessarily the same or identical, elements throughout. For purposes of clarity in illustrating the characteristics of the present disclosure, proportional relationships of the elements have not necessarily been maintained in the figures.

According to one example embodiment of the disclosure, a hydro energy apparatus can include a hydroelectric Kaplan turbine generator, one or more fixed wicket gate vanes, and one or more fixed turbine blades. In operation, the turbine blades rotate along an axis to produce offset electricity from one or more generators based on the velocity and volume of fluid flowing through the piping system, while maintaining a majority of the fluid flow and pressure within the piping system utilized. In one exemplary embodiment, the piping system can be a public water supply system that provides water for human consumption. For example, the hydro energy apparatus can be positioned between the main line of a public water supply system (e.g. a metropolitan, city, rural or cooperative water supply system) and the structure (e.g. office building, apartment building/complex, condominium, house, mall, shopping center, etc.) that is receiving the water, such as within a branch line that branches off of a main or primary water supply line that provides a water pathway to multiple structures. As such, multiple hydro energy apparatuses can be positioned within the multiple branch lines that branch off of a main or primary supply line for the public water supply system and provide water to a particular structure or structures. The terms Hydro Energy-Offset turbine generator, hydro energy apparatus, and hydro energy device may be used interchangeably throughout the disclosure.

Figure 1B:
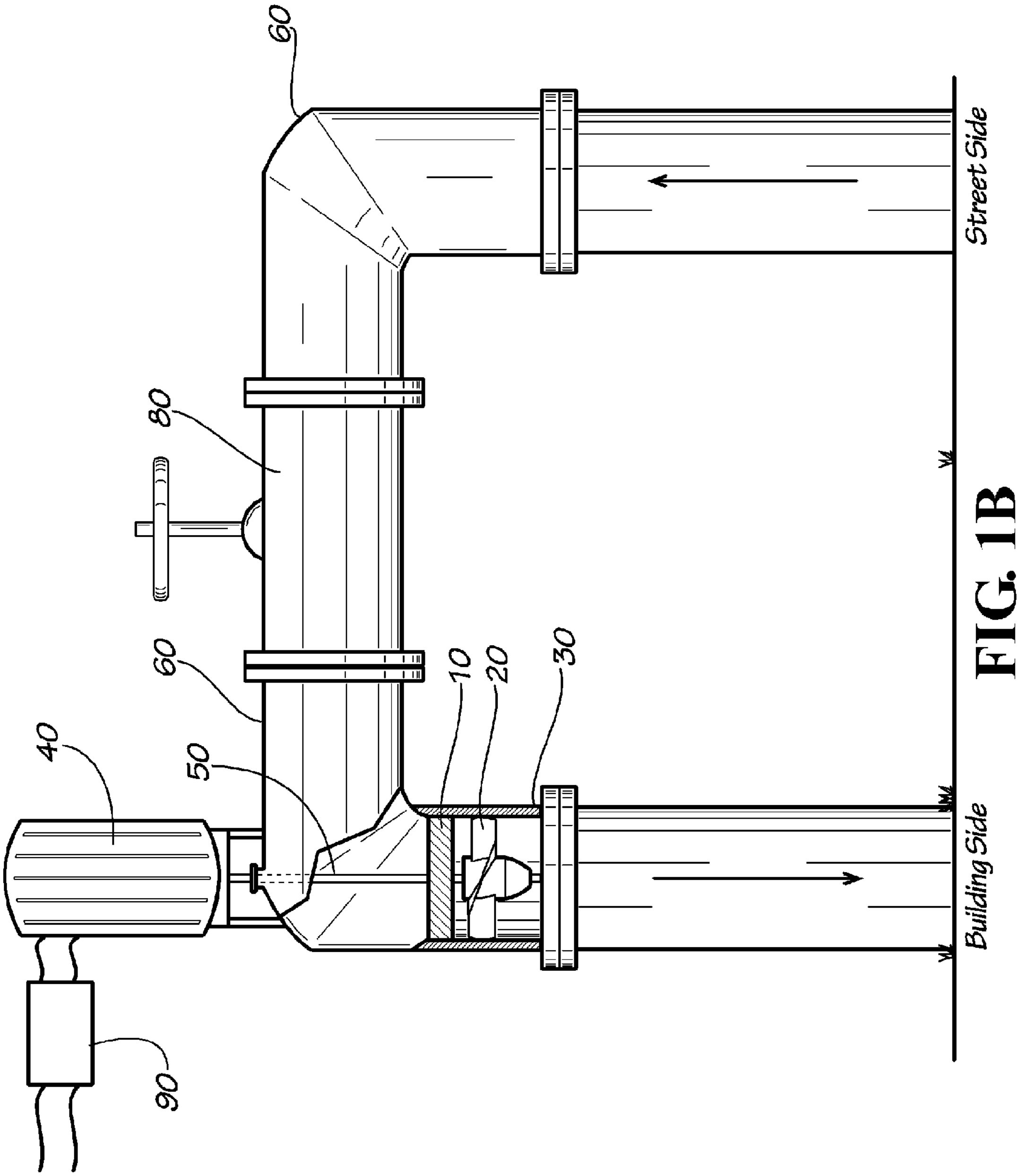
FIG. 1B illustrates a side elevation view, partially in cross-section, of a hydro energy apparatus illustrated with a direct drive generator configuration in accordance with another example embodiment of the present disclosure.
Figure 1C:
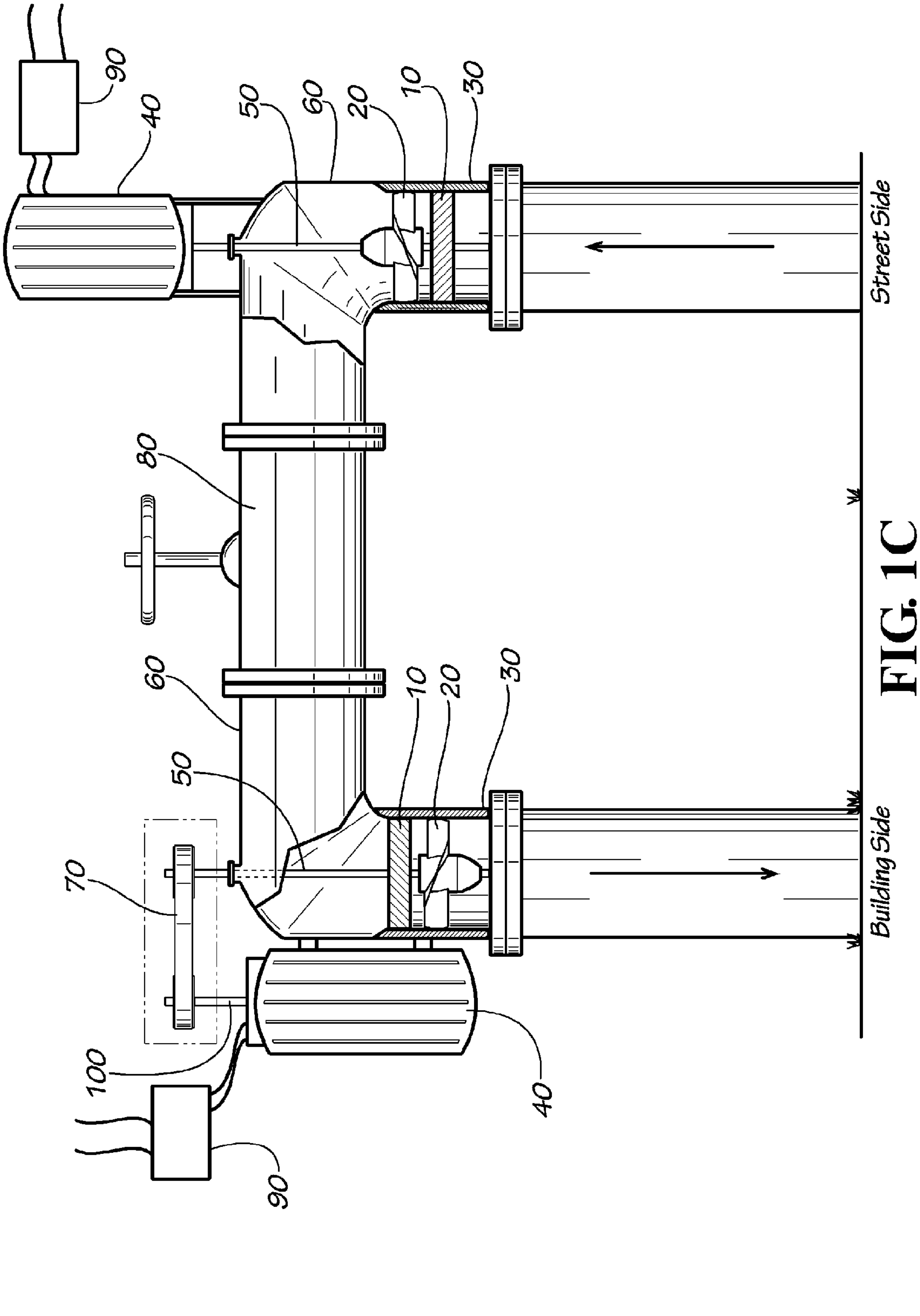
FIG. 1C illustrates a side elevation view, partially in cross-section, of a hydro energy apparatus with a belt driven and direct drive generator configuration utilizing both pipe elbows within the system in accordance with another example embodiment of the present disclosure.

The Hydro Energy-Offset turbine generator may be configured in several embodiments, including, but not limited to those example embodiments shown in FIGS. 1A-C. The configuration differences between the example embodiments may be based, for example, on whether a generator 40, is belt/transmission 70 driven or directly driven by the turbine drive shaft 50. Also, configuration differences may be determined by the direction of the fluid flow and the location of the pipe elbow 60. One such configuration difference may include the positioning or location of the wicket gate flow diverter 10 and the turbine 20 (as depicted in FIG. 1C) in order to incorporate a hydro energy device upstream of the backflow preventer 80.

FIG. 1A illustrates a side elevation view, in partial cross-section, of a hydro energy apparatus in a transmission/belt drive configuration connected within a backflow preventer piping system 80 above the ground in accordance with an example embodiment of the disclosure. Though shown above ground, the hydro energy apparatus could be positioned below ground or below grade in accordance with another example embodiment of the current disclosure. Referring now to FIG. 1A, the directional flow of the water or fluid within the piping system is from the “street” side to the “building” side and runs through the backflow preventer 80. One of the pipe elbows 60 is positioned downstream of the backflow preventer 80 and includes or is disposed adjacent to components of the exemplary hydro energy device.

Figure 3:
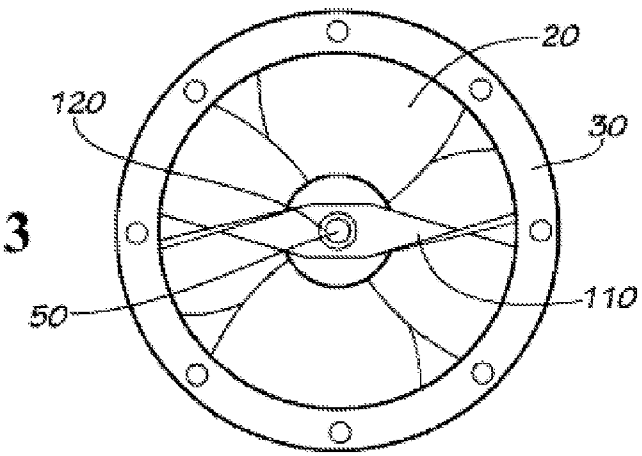
FIG. 3 illustrates a front view of the example reduction sleeve and turbine assembly of FIG. 1A.
Figure 5:
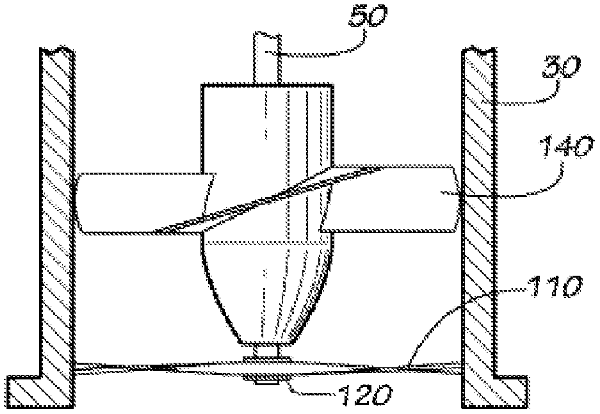
FIG. 5 illustrates a side view of the example turbine of FIG. 1A shown within a partial cross-sectional view of the reducing sleeve.

The example pipe elbow 60 can include therein a reducing sleeve 30, a turbine 20, a wicket gate flow diverter 10, and a drive shaft 50. In one example embodiment, the wicket gate flow diverter 10 is disposed within the pipe elbow 60 upstream from the turbine 20. The exemplary flow diverter 10 can help get the water or other fluid flowing in a direction and manner that will enhance the effect of the water or fluid on the turbine 20 to create an improved output as compared to a system without the diverter 10. Further, the example reducing sleeve 30 can be disposed adjacent the inner wall of the pipe elbow 60 for all or a portion of the flow length of the pipe elbow 60 to reduce the effective inner diameter of the pipe elbow 60. In addition, the example drive shaft 50 can include a first end, an intermediate portion, and a distal second end. The first end of the drive shaft 50 can be coupled to the turbine 20, either directly or indirectly, the intermediate portion can extend from the first end through at least a portion of the interior of the pipe elbow 60 and through the wall of the pipe elbow 60 to the second distal end of the drive shaft 50, which can be coupled, either directly or indirectly, to a belt drive system 70. Additionally, as shown in FIGS. 3 and 5, the reducing sleeve 30 may also include a reducing sleeve cross brace 110 and bearing 120. The bearing can be seated in an opening or channel passing through the cross brace 110 and receives a portion of the first end of the drive shaft 50 therethrough.

The example system can also include a control/monitoring unit 90 communicably coupled to the generator 40. In addition, the belt drive system 70 can be coupled to the generator 40 via the generator drive shaft 100. With variable, yet steady gallons per minute (GPM) and pound-force per square inch (PSI), the combination of flow and pressure of the fluid within the piping system, along with a reduction in pipe diameter in at least a portion of the pipe elbow 60, due to the reducing sleeve 30, causes the water or fluid within the piping system to engage the turbine 20 causing it to rotate and causing a corresponding rotation of the drive shaft 50. The rotational energy of the drive shaft 50 is transferred to the generator drive shaft 100 by way of the belt drive system 70, which engages the generator 40 to generate the desired offset-energy. The fluid then continues to flow toward the “building” side to its final destination.

FIG. 1B illustrates a side elevation view, in partial cross-section, of another example embodiment of a hydro energy apparatus in direct drive configuration as it is connected within the backflow preventer piping system 80 above the ground (new or existing). Though shown above ground, in alternative embodiments, the hydro energy apparatus could be positioned below ground or below grade in accordance with another example embodiment of the current disclosure. Referring now to FIG. 1B, similar to FIG. 1A, the directional flow of the water/fluid is from the street side to the building side and runs through the backflow preventer 80. The piping system also includes a pipe elbow 60 positioned downstream of the backflow preventer 80. In this example embodiment, the pipe elbow 60 includes some of the components of the hydro energy device. For example, the pipe elbow 60 can include therein a reducing sleeve 30, a turbine 20, a wicket gate flow diverter 10, and at least a portion of the drive shaft 50.

In one example the sleeve 30, turbine 20 and wicket gate flow diverter 10 are substantially the same as and positioned substantially the same as that described above in FIG. 1A and will not be repeated for the sake of brevity. The example drive shaft 50 can include a first end, an intermediate portion, and a distal second end. The first end of the drive shaft 50 can be coupled to the turbine 20, either directly or indirectly, the intermediate portion can extend from the first end through at least a portion of the interior of the pipe elbow 60 and through the wall of the pipe elbow 60 to a second distal end of the drive shaft 50, which can be coupled, either directly or indirectly, to the generator 40. In addition, the generator 40 can also include a support for the generator 40 in a direct drive configuration. In one example, the support can be coupled along one portion to the piping system, such as the pipe elbow 60, and have another portion coupled to the generator 40. As shown in FIGS. 3 and 5, the reducing sleeve 30 can also include a reducing sleeve cross brace 110 and bearing 120. The bearing can be seated in an opening or channel passing through the cross brace 110 and receives a portion of the first end of the drive shaft 50 therethrough.

The example system can also include a control/monitoring unit 90 communicably coupled to the generator 40. In one example embodiment, the control/monitoring unit 90 is configured to regulate the electrical power generated by the generator 40, provide for remote monitoring of the generator 40, provide a mechanism for emergency shut off of the generator 40 and/or other monitoring or control functions that may be desired. With variable, yet steady gallons per minute (GPM) and pound-force per square inch (PSI), the combination of flow and pressure of the water/fluid within the piping system, along with the reduction in pipe diameter in at least a portion of the pipe elbow 60 due to the inclusion of the reducing sleeve 30, causes the water/fluid within the piping system to engage the turbine 20 causing it to rotate and causing a corresponding rotation of the turbine drive shaft 50. The rotational energy of the turbine drive shaft 50 is transferred to the generator 40, where coupled, to generate the desired offset-energy. The fluid will then continue flowing through the piping system toward the building side to its final destination.

FIG. 1C shows a side elevation view, in partial cross-section, of another example embodiment of a hydro energy apparatus connected within both sides of the backflow preventer piping system 80 above the ground. Though shown above ground, the hydro energy apparatus could be underground in accordance with another example embodiment of the current disclosure. Referring now to FIG. 1C, the directional flow of the water or fluid within the piping system is from the “street” side to the “building” side and runs through the backflow preventer 80. One of the pipe elbows 60 is positioned downstream of the backflow preventer 80 and includes or is disposed adjacent to components of the exemplary hydro energy device. Additionally, one of the pipe elbows 60 is positioned upstream of the backflow preventer 80 and includes or is disposed adjacent to components of the exemplary hydro energy device.

The example pipe elbow 60, downstream of the backflow preventer 80 can include therein, a reducing sleeve 30, a turbine 20, a wicket gate flow diverter 10, and a drive shaft 50. In addition, the generator 40 also includes a belt drive system 70, and a control/monitoring unit 90. Further, the example reducing sleeve 30 can be disposed adjacent the inner wall of the downstream pipe elbow 60 for all or a portion of the flow length of the pipe elbow 60 to reduce the effective inner diameter of the pipe elbow 60. In addition, the example drive shaft 50 can include a first end, an intermediate portion, and a distal second end. The first end of the drive shaft 50 can be coupled to the turbine 20, either directly or indirectly, the intermediate portion can extend from the first end through at least a portion of the interior of the pipe elbow 60 and through the wall of the pipe elbow 60 to the second distal end of the drive shaft 50, which can be coupled, either directly or indirectly, to a belt drive system 70.

The example pipe elbow 60 upstream of the backflow preventer 80 can include therein, a reducing sleeve 30, a turbine 20, a wicket gate flow diverter 10, and a drive shaft 50. As shown, due to the location of the upstream pipe elbow 60, wicket gate flow diverter 10 is positioned towards the front portion of the drive shaft 50 due to the fluid directional flow. In addition, the generator 40 also includes a belt drive system 70, and a control/monitoring unit 90. Further, the example reducing sleeve 30 can be disposed adjacent the inner wall of the downstream pipe elbow 60 for all or a portion of the flow length of the pipe elbow 60 to reduce the effective inner diameter of the pipe elbow 60. In addition, the example drive shaft 50 can include a first end, an intermediate portion, and a distal second end. The first end of the drive shaft 50 can be coupled to the turbine 20, either directly or indirectly, the intermediate portion can extend from the first end through at least a portion of the interior of the pipe elbow 60 and through the wall of the pipe elbow 60 to the second distal end of the drive shaft 50, which can be coupled, either directly or indirectly, to a belt drive system 70.

With a variable, yet steady gallons per minute (GPM) and pound-force per square inch (PSI), the combination of flow and pressure, along with the reduction in pipe diameter due to the reducing sleeve 30, cause the turbine 20 to engage and rotate the drive shaft 50 to engage the generator 40 to create the desired offset-energy. The fluid then continues flowing toward the “building” side.

Additionally, as shown in FIGS. 3 and 5, the reducing sleeve 30 may also include a reducing sleeve cross brace 110 and bearing 120. The bearing can be seated in an opening or channel that passes through a portion of the cross brace 110 and the bearing receives a portion of the first end of the drive shaft 50 therethrough.

Figure 2A:
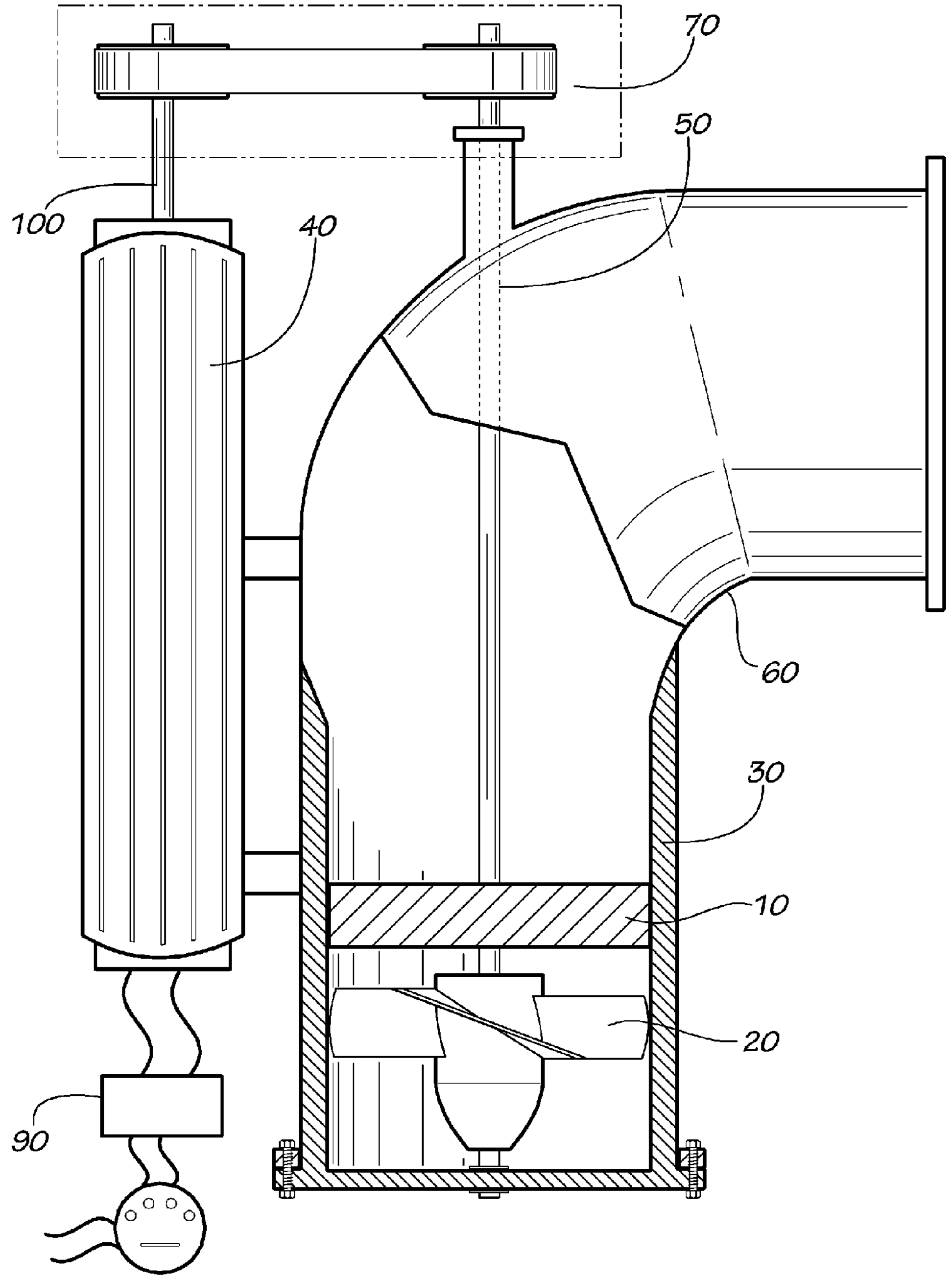
FIG. 2A illustrates a detailed cross-section view of the example hydro energy apparatus shown in FIG. 1A.

FIG. 2A illustrates a detailed cross-sectional view of the pipe elbow 60 with the components of one example embodiment of the hydro energy-offset turbine generator system, as shown in FIG. 1A. Now referring to FIGS. 1A and 2A, the exemplary reducing sleeve 30 serves to stabilize the drive shaft 50, as further described in FIGS. 3 and 5, and provide a reduction in the inner cross-sectional area of the pipe elbow 60. In one example, an inner diameter of the pipe elbow 60 with the reducing sleeve 30 is reduced by 0-6 inches as compared to the inner diameter of the pipe elbow 60 alone. The reduction of the inner cross-sectional area of the combined elbow 60 and sleeve 30 is typically achieved prior to the water/fluid attaining the position of the wicket gate diverter 10. The wicket gate diverter 10 then further isolates and purposefully directs the flow of the water/fluid toward the turbine 20. As the water/fluid flows through the sleeved portion of the pipe corner 60 and causes the turbine 20 to rotate. The rotation of the turbine 20 causes a corresponding rotation in the drive shaft 50, which is coupled to the turbine 20. The belt drive system 70 is engaged and revolves as it is driven by the rotation of the turbine drive shaft 50. The belt drive system 70 transfers the rotational energy of the turbine drive shaft 50 to the generator 40 by causing a geared or corresponding rotation in the shaft 100 of the generator 40, thereby generating offset electricity that may then be fed back into the grid through a control unit device 90. Alternatively, the energy generated by the generator 40 may be utilized in other ways, such as feeding a storage bank of batteries.

Figure 2B:
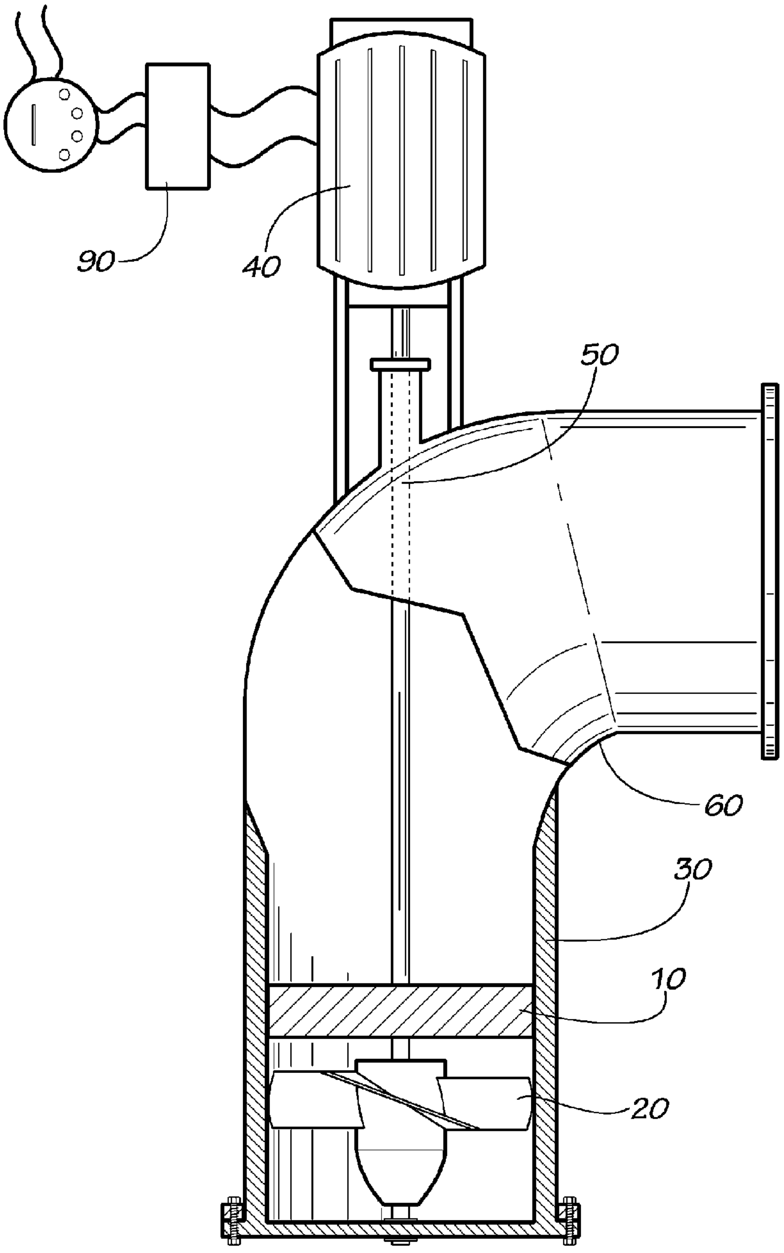
FIG. 2B illustrates a detailed cross-section view of the example hydro energy apparatus shown in FIG. 1B.

FIG. 2B depicts a cross-sectional view of the pipe elbow 60 with components that comprise the hydro energy-offset turbine generator device as shown in FIG. 1B. Now referring to FIGS. 1B and 2B, the exemplary reducing sleeve 30 serves to stabilize the drive shaft 50 as further described in FIGS. 3 and 5. Reducing sleeve 30 provides a reduction in the pipe elbow 60, for example, by 1-6 inches as compared with the inner diameter of the pipe elbow 60 alone. The reduction of the inner cross-sectional area of the combined elbow 60 and sleeve 30 is typically achieved prior to the water/fluid attaining the position of the wicket gate diverter 10. The wicket gate diverter 10 then further isolates and purposefully directs the flow of the water/fluid toward the turbine 20. As the water/fluid flows through the sleeved portion of the pipe corner 60 and causes the turbine 20 to rotate. The rotation of the turbine 20 causes a corresponding rotation in the drive shaft 50, which is coupled to the turbine 20. The rotational energy of the turbine drive shaft 50 is transferred to the generator 40, where coupled, thereby generating offset electricity that may then be fed back into the grid through a control unit device 90. Alternatively, the energy generated by the generator 40 may be utilized in other ways, such as feeding a storage bank of batteries.

Figure 2C:
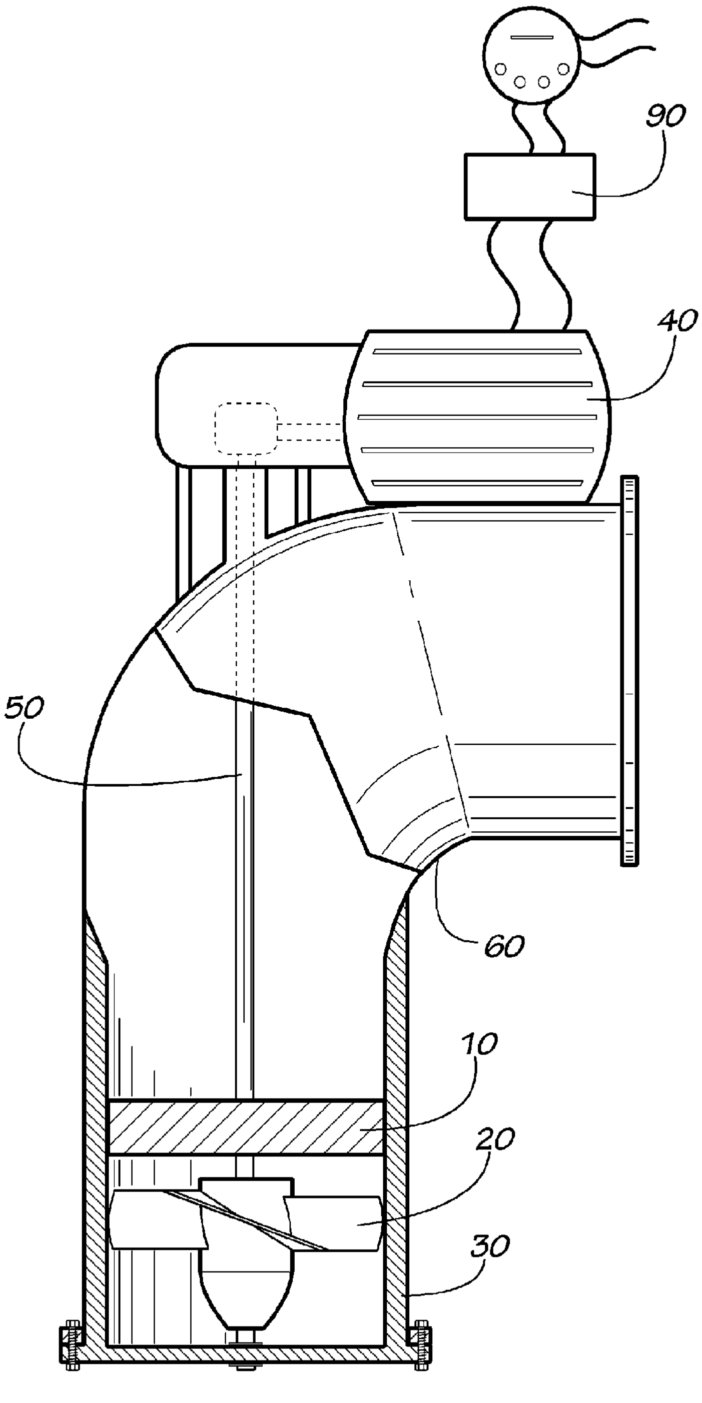
FIG. 2C illustrates a detailed cross-section view of the hydro energy apparatus utilizing a transmission drive generator in accordance with one example embodiment of the present disclosure.

FIG. 2C depicts a detailed cross sectional view of the pipe elbow 60 with the components that comprise the hydro energy-offset turbine generator device as shown in utilizing a right angle transmission configuration. Now referring to FIG. 2C, the exemplary reducing sleeve 30 serves to stabilize the drive shaft 50, as further described in FIGS. 3 and 5, and provide a reduction in the inner cross-sectional area of the pipe elbow 60. In one example, an inner diameter of the pipe elbow 60 with the reducing sleeve 30 is reduced by 0-6 inches as compared to the inner diameter of the pipe elbow 60 alone. The reduction of the inner cross-sectional area of the combined elbow 60 and sleeve 30 is typically achieved prior to the water/fluid attaining the position of the wicket gate diverter 10. The wicket gate diverter 10 then further isolates and purposefully directs the flow of the water/fluid toward the turbine 20. As the water/fluid flows through the sleeved portion of the pipe corner 60 and causes the turbine 20 to rotate. The rotation of the turbine 20 causes a corresponding rotation in the drive shaft 50, which is coupled to the turbine 20. The belt drive system 70 transfers the rotational energy of the turbine drive shaft 50 to the generator 40 by causing a geared or corresponding rotation in the shaft 100 of the generator 40, thereby generating offset electricity that may then be fed back into the grid through a control unit device 90. The right angle transmission system 70 transfers the rotational energy of the turbine drive shaft 50 to the generator 40 by causing a geared or corresponding rotation in the shaft 100 of the generator 40, thereby generating offset electricity that may then be fed back into the grid through a control unit device 90, or utilized in other ways, such as feeding a storage bank of batteries.

FIG. 3 illustrates a front view through the outflow end portion of the pipe elbow 60 of the example reduction sleeve and turbine assembly of FIG. 1A in accordance with an example embodiment of the disclosure. Referring now to FIG. 3, in certain exemplary embodiments, the reducing sleeve 30 houses and secures some of the components of the turbine 20. As shown, the reducing sleeve 30 includes a cross brace 110 that can be, for example, welded to opposing sides of the reducing sleeve 30. The cross brace 110 can include an opening or channel therethrough that houses a bearing 120. The bearing 120 includes a channel that receives a portion of the first end of the turbine drive shaft 50 therethrough. As shown, in one example embodiment, the reducing sleeve cross brace 110 is twisted to allow for minimal flow reduction and disturbance as the water/fluid exits the hydro energy-offset turbine generator system. The drive shaft 50 extends through the turbine 20 and out of the pipe elbow 60, where the second end of the drive shaft 50 is coupled to the belt drive system 70.

In certain example embodiments, the reducing sleeve 30 can serve multiple purposes. One purpose can be to reduce the diameter and/or cross-sectional area of the pipe, which causes a type of Venturi effect, where the velocity of the water/fluid increases as the cross-sectional area decreases. Additionally, the reducing sleeve 30 can serve to stabilize internal components of the energy-offset unit inside the pipe elbow 60. The exemplary wicket gate flow diverter 10 is coupled, for example on opposing ends, to the reducing sleeve 30. As shown, one or more bearings 120 are incorporated into the wicket gate flow diverter 10 and the reducing sleeve cross brace 110. This arrangement of bearings 120 on opposite sides of the turbine 20 can help maintain the position of the generator drive shaft 50 and reduce possible wobble in the drive shaft 50 due to the variations in flow and pressure of the water/fluid. Additionally, the reducing sleeve 30 facilitates maintenance in the event that a system component requires adjustment or replacement. For example, in one embodiment, the turbine 20 and flow diverter 10 may be directly or indirectly coupled to the sleeve 30 such that removal of the sleeve 30 from the pipe elbow 60 will also remove the turbine 20 and flow diverter 10. Furthermore, the sleeve 30 can have irregular thickness or shape at different points around its circumference to provide adjustability with respect to an irregularly-shaped pipe elbow 60 to provide a substantially constant diameter once the sleeve 30 is positioned within the pipe elbow 60.

Figure 4:
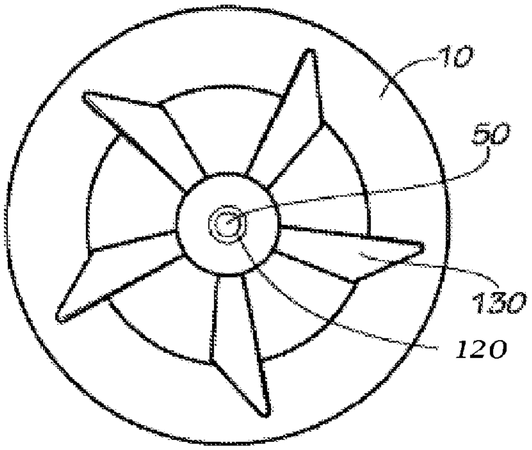
FIG. 4 illustrates a front view of the example wicket gate flow diverter of FIG. 1A.

FIG. 4 illustrates a front view of a wicket gate flow diverter 10 with a plurality of fixed wicket gate vanes 130 in accordance with an example embodiment of the disclosure. Now referring to FIG. 4, the drive shaft 50 protrudes through the center of the wicket gate flow diverter 10 with bearings 120 at the front and rear of the wicket gate flow diverter 10 in one example embodiment. One or more wicket gate vanes 130 extend radially or substantially radially outward from a central hub or center of the wicket gate flow diverter 10. Each vane 130 can be angularly disposed at any angle between 0-90 degrees with regard to the general direction of fluid flow in the pipe elbow 60. The particular angle of each vane 130 can be configurable based on the particular aspects of the pipe system in which the device is installed. In one exemplary embodiment, the angle for the vanes 130 is determined based, at least in part, on the flow rate and PSI pressure of the water or other fluid within the pipe elbow 60. Furthermore, while the example of FIG. 4 shows five fixed vanes 130, any number of vanes, greater or lesser than five, may be provided based on the particular operational aspects of the system being configured.

FIG. 5 illustrates a side view of a turbine 20 of the hydro energy system in accordance with an example embodiment of the disclosure. Referring to FIG. 5, the turbine 20 is coupled to the drive shaft 50 adjacent to the first end of the drive shaft 50. According to some example embodiments of the disclosure, the first end of the drive shaft 50 is movably coupled to a bearing 120 that is seated in the opening or channel of the reducing sleeve cross brace 110. The reducing sleeve cross brace 110 includes a first end and an opposing second end.

Each of the first and second ends of the brace 110 are coupled to the reducing sleeve 30, for example, opposing sides of the inner wall of the reducing sleeve 30. The exemplary turbine 20 can include multiple fixed runner vanes 140, each extending out from an inner hub of the turbine 20. In certain example embodiments, the runner vanes 140 are positioned equidistantly about an outer perimeter of the inner hub of the turbine 20. It will be appreciated by one of ordinary skill in the art that multiple applications of the turbine 20 at various fixed runner vane 140 degrees may be applied based on the variation in fluid flow and pressure on a per application basis.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

Although only a few example embodiments have been described in detail above, those skilled in the art will readily appreciate that many modifications are possible in the example embodiments without materially departing from this disclosure. Accordingly, all such modifications are intended to be included within the scope of this disclosure as set forth in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

What is claimed is:

1. A hydro energy system, comprising:
- a pipe elbow comprising:
  - an inner wall defining a fluid carrying conduit;
- a reducing sleeve removably coupled to the pipe elbow and disposed along at least a portion of the inner wall of the pipe elbow, wherein the reducing sleeve reduces a cross-sectional area for fluid flow in the fluid carrying conduit;
- a turbine disposed in the fluid carrying conduit;
- a drive shaft comprising a first end and a distal second end, wherein the turbine is coupled to the drive shaft between the first end and the second end and is configured to rotationally drive the drive shaft and wherein the second end of the drive shaft extends to an area outside an exterior wall of the pipe elbow; and
- a generator disposed outside the exterior wall of the pipe elbow and coupled to the drive shaft adjacent the second end, wherein the generator generates electrical power in response to the rotational drive of the drive shaft by the turbine.

2. The hydro energy system of claim 1, further comprising a flow diverter coupled to the reducing sleeve and disposed in the fluid carrying conduit upstream of the turbine.

3. The hydro energy system of claim 2, wherein the flow diverter is a wicket gate flow diverter.

4. The hydro energy system of claim 1, wherein the generator is directly coupled to the drive shaft adjacent the second end of the drive shaft.

5. The hydro energy system of claim 1, further comprising a control unit communicably coupled to the generator, wherein the control unit is configured to regulate the electrical power generated by the generator.

6. The hydro energy system of claim 1, further comprising a belt drive system, wherein the drive shaft is coupled to a first portion of the belt drive system adjacent the second end of the drive shaft and wherein the generator is coupled to a second portion of the belt drive system, wherein the belt drive system is configured to transfer the rotational drive of the drive shaft to the generator.

7. The hydro energy system of claim 1, wherein the reducing sleeve further comprises a cross brace member coupled to the reducing sleeve and extending in a direction substantially orthogonal to a direction of fluid flow in the fluid carrying conduit, wherein the cross brace comprises a bearing sleeve, and wherein the drive shaft is coupled to the cross brace of the reducing sleeve adjacent the first end of the drive shaft.

8. The hydro energy system of claim 7, wherein the cross brace member is twisted about a longitudinal axis of the cross brace member.

9. The hydro energy system of claim 7, further comprising a flow diverter coupled to an inner wall of the reducing sleeve and disposed in the conduit upstream of the turbine, wherein the flow diverter comprises:
- an inner hub;
- a bearing sleeve defining a channel through the inner hub, wherein at least a portion of the drive shaft extends through the channel; and
- a plurality of director vanes extending out from the inner hub in a plurality of directions.

10. A hydro energy system, comprising:
- a turbine disposed in a fluid carrying conduit comprising a pipe elbow having an inner wall;
- a reducing sleeve disposed along at least a portion of the inner wall of the fluid carrying conduit, the reducing sleeve reducing a cross-sectional area for fluid flow in the fluid carrying conduit;
- a flow diverter disposed in the conduit upstream of the turbine;
- a drive shaft coupled to and rotationally driven by the turbine, wherein the drive shaft comprises a first portion coupled to the turbine and a distal second portion extending outside of the conduit; and
- a generator disposed outside of the conduit and operatively coupled to the drive shaft, wherein the generator generates electrical power in response to the rotational drive of the drive shaft by the turbine.

11. The hydro energy system of claim 10, wherein the flow diverter is coupled to the reducing sleeve and comprises a wicket gate flow diverter comprising an inner hub, an aperture defining a passageway through the inner hub, wherein at least a portion of the drive shaft extends through the passageway, and a plurality of fixed director vanes extending out from the inner hub in a plurality of directions.

12. The hydro energy system of claim 10, wherein the generator is operatively coupled to the drive shaft by a transmission system.

13. The hydro energy system of claim 10, wherein the generator is directly coupled to the distal second portion of the drive shaft.

14. The hydro energy system of claim 10, further comprising a control unit communicably coupled to the generator, wherein the control unit is configured to regulate the electrical power generated by the generator.

15. The hydro energy system of claim 10, wherein the reducing sleeve is removably coupled to the fluid carrying conduit.

16. A hydro energy system, comprising:

a fluid carrying conduit comprising an inner wall defining a fluid passageway having a cross-sectional area;

a turbine disposed in the fluid carrying conduit;

a reducing sleeve coupled to the fluid carrying conduit and disposed along the inner wall of the fluid carrying conduit proximate the turbine, wherein the reducing sleeve reduces the cross-sectional area of the fluid passageway;

a drive shaft comprising a first portion and a distal second portion, wherein the first portion is coupled to and rotationally driven by the turbine, and wherein the second portion extends from the first portion to an area outside the conduit;

a cross brace member coupled to the reducing sleeve and extending in a direction substantially orthogonal to a direction of fluid flow in the fluid carrying conduit, wherein the cross brace comprises a bearing sleeve, wherein the drive shaft is disposed through the bearing sleeve of the cross brace, and wherein the cross brace member is twisted about a longitudinal axis of the cross brace member; and a generator disposed outside the conduit and operatively connected to the drive shaft, wherein the generator generates electrical power in response to the rotational drive of the drive shaft by the turbine.

17. The hydro energy system of claim 16, wherein the generator is directly coupled to the distal second portion of the drive shaft.

18. The hydro energy system of claim 16, further comprising a control unit associated with and communicably coupled to the generator and configured to regulate the electrical power generated by the generator.

19. The hydro energy system of claim 16, further comprising a flow diverter coupled to the reducing sleeve and disposed in the conduit upstream of the turbine, the flow diverter comprising an inner hub and a plurality of angularly disposed director vanes extending radially out from the inner hub.

20. The hydro energy system of claim 16, wherein the fluid carrying conduit comprises a pipe elbow, wherein the reducing sleeve is coupled to the pipe elbow and disposed along the inner wall of the pipe elbow.

* * * * *